Figure 1:
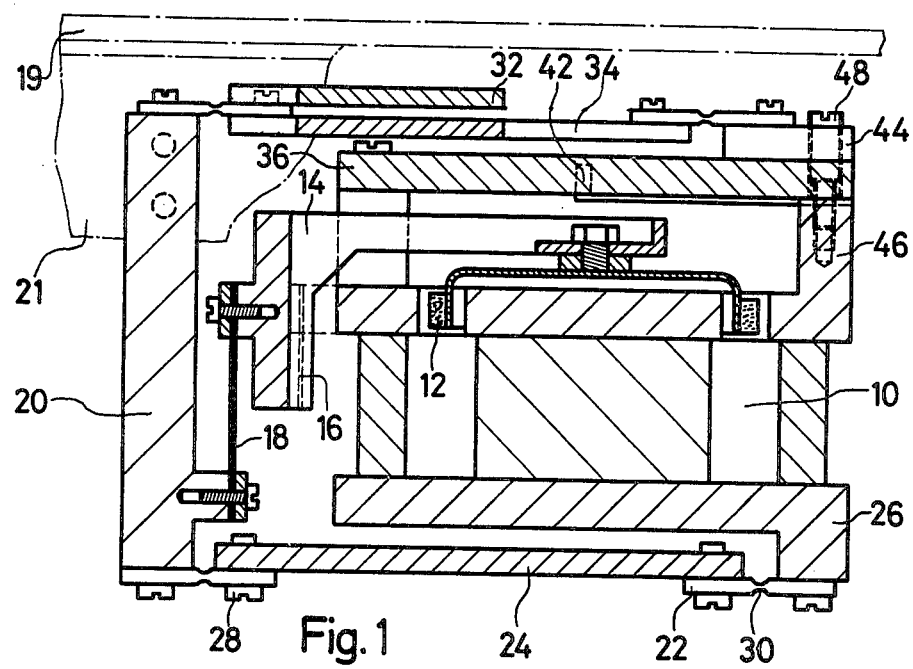

United States Patent [19]

Kunz

[11] 4,184,557
[45] Jan. 22, 1980

[54] TOP LOADING BALANCE
[75] Inventor: Peter Künz, Tann-Ruti, Switzerland
[73] Assignee: Mettler Instrumente AG, Greifensee, Switzerland
[21] Appl. No.: 952,075
[22] Filed: Oct. 17, 1978
[30] Foreign Application Priority Data
  Mar. 8, 1978 [CH] Switzerland .......................... 2503/78
[51] Int. Cl.² .............................................. G01G 3/08
[52] U.S. Cl. .................................................. 177/229
[58] Field of Search ................. 177/210 EM, 212, 229
[56] References Cited
  U.S. PATENT DOCUMENTS
  4,062,416  12/1977  Berg et al. ........................ 177/229 X
  4,090,575  5/1978  Kunz et al. .................... 177/210 EM
  4,148,370  4/1979  Luchinger et al. .......... 177/210 EM Primary Examiner—George H. Miller, Jr.
Attorney, Agent, or Firm—Toren, McGeady and Stanger

[57] ABSTRACT

The linking system which links the load carrier of a top-loading balance with the fixed supporting structure of the balance in a parallelogram linkage includes first and second contiguously juxtaposed upper links and a lower third link, and three flexible connectors associated with each link. Each connector defines a pivot axis and connects the associated link with the load carrier or the supporting structure for movement of the link about the pivot axis. One of the pivot axes for each of the three links may be adjusted transversely.

6 Claims, 2 Drawing Figures

U.S. Patent

Jan. 22, 1980

4,184,557

TOP LOADING BALANCE

This invention relates to top-loading balances, and particularly to a top-loading balance equipped with an improved parallelogram linkage for the load carrier on which a weighing pan is normally fastened.

The parallelogram linkage affects the performance of the balance under a load eccentrically placed on the weighing pan so as to exert a bending moment on the load carrier. It is known from Swiss Pat. No. 524,869 to connect the load carrier of a balance with the supporting structure of the balance by means of triangular sheet metal links, each link being connected to the supporting structure by two pivots and to the load carrier by one pivot. It has also been proposed in the German published patent application No. 25 18 022, to give each of the two links the shape of an isoceles trapezoid and to attach it to the load carrier by a single pivot. These and similar balances have been found effective if the load is concentrated almost in a point of the load carrier, and are limited to low or moderate capacities not exceeding a few kilograms.

It has been found necessary to provide a wider base for the parallelogram linkage on both the load carrier and the supporting structure in balances of higher capacity in order to reduce the effects of eccentric loading on the weight indication. An example for this type of balance is shown in German published patent application No. 20 09 858. There is disclosed a balance having a relatively narrow, lower link in the approximate shape of a thin plate whereas the upper link consists of two narrow, parallel strips fastened far apart. It is relatively simple to adjust the parallelogram linkage of this balance to minimize the effects of eccentric loading, but the balance is unsuited for relatively heavy loads because the thin, widely spaced, upper links to not provide adequate rigidity to the linkage. This shortcoming is enhanced in a balance of small overall height and correspondingly reduced vertical dimensions of the parallelogram linkage which are preferred in many applications.

It is a primary object of this invention to provide a top-loading balance capable of handling relatively heavy loads with good precision because of adequate rigidity of its parallelogram linkage, yet capable of simple adjustment of the linkage for minimizing the effects of eccentric loading.

According to the invention, there are provided three, plate-shaped, rigid links of which a first one is contiguously adjacent a second link and remote from the third link. Three flexible connectors are associated with each link and define respective pivot axes for movement of the associated link relative to the load carrier and the supporting structure of the balance. The position of at least one of the pivot axes defined by the three connectors may be adjusted transversely.

Figure 2:
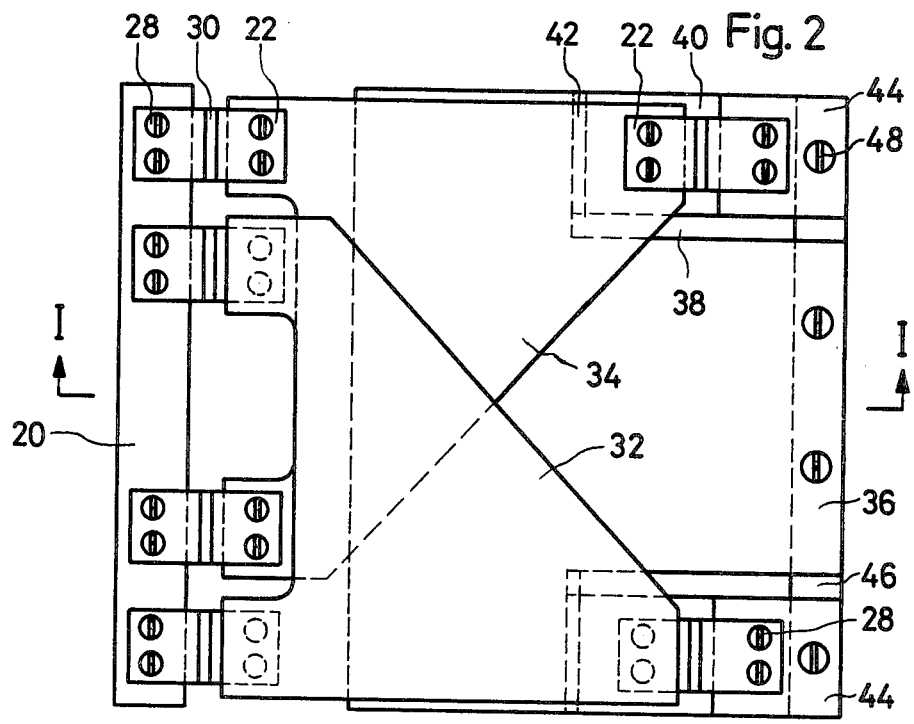

Other features, additional objects, and many of the attendant advantages of this invention will readily be appreciated as the same becomes better understood by reference to the following detailed description of a preferred embodiment when considered in connection with the appended drawing in which:

FIG. 1 shows a balance of the invention in fragmentary, elevational section on the line I—I in FIG. 2; and FIG. 2 illustrates elements of the balance of FIG. 1 in top plan view.

The illustrated balance is provided with electro-magnetic load compensation in the manner known, for example, from Swiss Pat. No. 591,685, and neither the electrical components of the balance nor other necessary elements not directly relevant to this invention have been illustrated in detail.

The fixed supporting structure of the balance includes a permanent magnet system 10 whose air gap received a coil 12 normally connected to a source of electric current, not shown. The coil is mounted on the longer arm of a two-armed lever 14 whose fulcrum is provided by flexible connectors 16 fastened to the supporting structure. The shorter arm of the lever 14 is secured to a load carrier 20 by another flexible connector 20. A rectangular weighing pan 19, partly indicated in FIG. 1 in phantom view, is normally attached to the load carrier 20 by means of brackets 21.

The load carrier 20 is a relatively thick, rectangular plate, apertured to reduce its weight without significant loss in rigidity, as is known and not specifically shown. The load carrier is connected to the supporting structure in a parallelogram linkage by means of several links. A lower link 24 is fastened to the bottom edge of the load carrier 20 by means of two connector straps 22 of flexible metal. Two straps 22 connect the other end of the link 24 with a horizontally elongated rib 26 of the permagnet magnet system 10. All straps 22 which provide the pivots of the parallelogram linkage partly constituted by the supporting structure, by the load carrier 20, and the lower link 24 are identical, as is also evident from FIG. 2. The ends of each strap are fastened by two screws 28 to one element of the linkage, and by two additional screws to another element. A reduced portion 30 of the strap between the two sets of screws defines the pivot axis.

The lower link 24 is a rectangular plate of high-strength aluminum alloy, 3 mm thick. Its width is approximately equal to the corresponding dimension of the load carrier evident from FIG. 2. The four associated connector straps are located at the four corners of the link 24 to provide a base of maximum width for the linkage.

The upper, horizontally extending unit of the linkage is constituted by two links 32, 34 consisting of the same material as the lower link 24. They each have the approximate, identical shape of a right triangle. The two approximately triangular plates 32, 34 are closely juxtaposed in two parallel, contiguous planes in such a manner that the two hypotenuses intersect each other in the plane of projection of FIG. 2, and the legs of each are parallel to respective legs of the other.

The spacing of the normally horizontal planes of the two links 32, 34 is of the order of a few millimeters and equal to the thickness of each strap 22. The three straps 22 associated with the link 32 are fastened to the underside of the link, and those associated with the link 34 are fastened to the top of the link 34, so that the six pivot axes respectively defined by the straps 22 on the links 32, 34 are located in a common plane. As is best seen in FIG. 2, the two links 32, 34 partly overlap each other. Two straps 22 are mounted on respective integral lugs projecting from the leg parallel to the load carrier 20, and the two links are offset in the direction of these legs so that the pivot axes of the four straps connecting the two links 32, 34 to the load carrier 20 are aligned in a normally horizontal line.

A horizontal supporting plate 36 is fixedly fastened to the magnet system 10 above the lever 14. It is of rectangular, overall shape. Two slots 38, parallel to the lever 14, separate laterally terminal tongue portions 40 from the remainder of the supporting plate 36. Transverse notches 42 across the roots of the tongue portions permit flexing of the tongue portions under adequate applied force. The part of the plate 36 between the tongue portions is fixedly fastened to another rib 46 of the magnet system 10 in such a manner as to leave a narrow clearance gap between the tongue portions 40 and the rib 46.

The third connector straps 22 respectively associated with the links 32, 34 are fixedly fastened to spacer blocks 44 on the two tongue portions 40. A screw 48 carrying two threads of different diameter and pitch engages different mating threads in a bore of each spacer 44 and in a bore of the rib 46 so that the tongue portions 40 may be flexed in the approximate areas of the notches 42 to shift the pivot axes of the afore-mentioned connector straps in a transverse, vertical direction when the screws 48 are turned. The two pivots connecting the upper, horizontally extending unit 32, 34 of the parallelogram linkage to the supporting structure may thus be adjusted transversely independent of each other without causing stresses in the unit although it consists of rigid plates. The problem arising in adjusting only one pivot of two aligned pivots on a single, rigid, plate-shaped link are thus avoided.

It is generally more convenient to have the upper unit of the linkage constituted by two independently adjustable, rigid plates because of the accessibility of the associated pivots, but other considerations may make it preferable to use two links in the lower unit. Two links in each of the two units may permit coarse adjustment of the lower pivots on the supporting structure during assembly, and fine adjustment of the upper pivots at the ultimate user's premises.

Arranging all connector straps 22 in a common plan provides the linkage with four closely defined pivot axes. Moreover, the space occupied by the linkage is employed to best advantage, and the necessary height of the balance is reduced. The links of the upper unit combine high rigidity with low weight in a particularly advantageous manner because of their approximately triangular shape. This permits the links 32, 34 to be fastened each by only one strap 22 to the supporting structure so that adjustment can be made on the stationary part of the balance in only one strap per pivot.

Only the coil 12 represents the electrical system for indicating the presence and magnitude of a load carried by the load carrier 20, and the improved parallelogram linkage of the invention is particularly advantageous in balances equipped with such a load indicating system which requires but a minimal deformation of the linkage, but the invention is not limited to any specific load indicating system.

It should be understood, therefore, that the foregoing disclosure relates only to a preferred embodiment, and that it is intended to cover all changes and modifications of the example of the invention herein chosen for the purpose of the disclosure which do not constitute departures from the spirit and scope of the invention set forth in the appended claims.

What is claimed is:

1. In a top-loading balance including a support member, a load carrier member, linking means linking said load carrier member to said support member in a parallelogram linkage, and indicating means for indicating the presence of a load carried by said load carrier member, said linking means including a plurality of links and a plurality of flexible connectors associated with each link, each connector defining a pivot axis and connecting the associated link with one of said members for movement of said link about said pivot axis, the improvement in said linking means which comprises:
    (a) said plurality of links including three plate-shaped, rigid links,
    (b) a first one of said three links being contiguously adjacent a second link and remote from the third link,
    (c) three of said flexible connectors being associated with each of said three links, and
    (d) adjusting means for transversely adjusting the position of at least one of the pivot axes defined by said three connectors.

2. In a balance as set forth in claim 1, said third link being downwardly spaced from said first and second links in the normal operating position of said balance in which gravity acting on said load exerts a downward force on said load carrier member.

3. In a balance as set forth in claim 1, said first and second links being substantially triangular.

4. In a balance as set forth in claim 1, two connectors associated with each of said first and second links connecting the associated link to said load carrier member, the third connector associated with each of said first and second links connecting said associated link to said support member.

5. In a balance as set forth in claim 1, said first and second links extending in respective, substantially parallel planes and being at least partly aligned transversely to said planes.

6. In a balance as set forth in claim 5, the connectors associated with said first and second links defining respective pivot axes located at least approximately in a common plane.

* * * * *